US012637875B2

(12) United States Patent
Li et al.

(10) Patent No.: US 12,637,875 B2
(45) Date of Patent: May 26, 2026

(54) LOCKSET

(71) Applicant: Meta intelligence LLC, Dover, DE (US)

(72) Inventors: Jun Li, Zhongshan (CN); Xifeng Wang, Zhongshan (CN); Jian Chen, Zhongshan (CN); Fei Lei, Zhongshan (CN)

(73) Assignee: Meta intelligence LLC, Dover, DE (US)

( * ) Notice: Subject to any disclaimer, the term of this patent is extended or adjusted under 35 U.S.C. 154(b) by 0 days.

(21) Appl. No.: 19/294,409

(22) Filed: Aug. 8, 2025

(65) Prior Publication Data

US 2025/0361745 A1 Nov. 27, 2025

Related U.S. Application Data

(63) Continuation-in-part of application No. PCT/CN2023/078469, filed on Feb. 27, 2023.

(30) Foreign Application Priority Data

Feb. 10, 2023 (CN) ........................ 202310112931.X

(51) Int. Cl.
*B05B 9/08* (2006.01)
*E05B 9/08* (2006.01)
*E05B 17/00* (2006.01)

(52) U.S. Cl.
CPC ................ *E05B 9/08* (2013.01); *E05B 17/00* (2013.01)

(58) Field of Classification Search
CPC .................................. E05B 9/08; E05B 17/00
See application file for complete search history.

(56) References Cited

U.S. PATENT DOCUMENTS 3,800,573 A * 4/1974 Babb, Jr. ............... E05B 55/005 70/217
4,760,380 A * 7/1988 Quenneville ........... E05B 17/10 340/542

(Continued)

FOREIGN PATENT DOCUMENTS

CA 543744 A 7/1957
CN 112377003 A 2/2021

(Continued)

*Primary Examiner* — Mark A Williams
(74) *Attorney, Agent, or Firm* — Bayramoglu Law Offices LLC

(57) ABSTRACT

A lockset includes symmetrically arranged front and rear handle assemblies, where the rear handle assembly includes a rear fixing base and a rear handle body. The rear fixing base is mounted on a door leaf. A connecting rod is configured to connect the front and rear assemblies. With a head facing rearward, a first fastening screw is provided outside the rear handle body to lock and connect the rear fixing base to the connecting rod. The rear handle body is provided with a through hole corresponding to the fastening screw. A movable cover body is configured to cover or expose the through hole for convenient operation. The rear handle body includes a supporting shaft and a housing. The housing and the cover body together form a gripping portion. The through hole is provided in the housing. An avoidance groove is provided on an outer side of the supporting shaft.

20 Claims, 6 Drawing Sheets

(56) References Cited

U.S. PATENT DOCUMENTS

| | | | | | |
|---|---|---|---|---|---|
| 4,770,012 | A * | 9/1988 | Johansson | E05B 47/0669 | 70/277 |
| 4,854,143 | A * | 8/1989 | Corder | E05B 47/068 | 70/279.1 |
| 4,901,545 | A * | 2/1990 | Bacon | E05B 47/0653 | 70/285 |
| 5,712,626 | A * | 1/1998 | Andreou | G07C 9/00857 | 70/216 |
| 6,297,725 | B1 * | 10/2001 | Tischendorf | E05B 47/068 | 70/478 |
| 6,378,344 | B1 * | 4/2002 | Gartner | E05B 47/0657 | 70/213 |
| 7,248,163 | B2 * | 7/2007 | Wu | E05B 65/0035 | 340/815.45 |
| 11,072,944 | B2 * | 7/2021 | Peng | E05B 47/068 | |
| 11,214,979 | B2 * | 1/2022 | Huang | E05B 9/08 | |
| 11,624,208 | B2 * | 4/2023 | Shumaker | E05B 13/108 | 70/432 |
| 2014/0260451 | A1 * | 9/2014 | Quach | E05B 47/0012 | 70/278.1 |

FOREIGN PATENT DOCUMENTS

| | | | |
|---|---|---|---|
| CN | 114622774 | A | 6/2022 |
| CN | 217481011 | U | 9/2022 |
| CN | 217760477 | U | 11/2022 |
| CN | 219587369 | U | 8/2023 |
| DE | 102004009992 | A1 | 9/2005 |

* cited by examiner

LOCKSET

CROSS REFERENCE TO THE RELATED APPLICATIONS

This application is the continuation-in-part application of International Application No. PCT/CN2023/078469, filed on Feb. 27, 2023, which is based upon and claims priority to Chinese Patent Application No. 202310112931.X, filed on Feb. 10, 2023, the entire contents of which are incorporated herein by reference.

TECHNICAL FIELD

The present disclosure relates to the technical field of locksets.

BACKGROUND

A door lock is an important component of building security, and its structural design and mounting method directly affect the convenience of use and security. There are various types of door locks in the prior art, among which knob locks are commonly used indoors. The handle of a knob lock includes a supporting shaft and a gripping portion. The outer diameter of the gripping portion is larger than that of the supporting shaft, such that the handle resembles a lollipop shape, which is convenient to grip and has a simple and elegant appearance, making the knob lock favored by users. The knob lock typically includes a front handle assembly and a rear handle assembly designed as separate units. The rear handle assembly includes a rear mounting base and a rear handle. Currently, there are various methods for mounting the rear mounting base and the rear handle onto a door leaf, but the mounting process is cumbersome.

SUMMARY

To solve the technical problems in the prior art, the present disclosure aims to optimize the mounting structure of the rear handle assembly of an existing lockset, enabling its convenient mounting onto the door leaf.

In view of this, the present disclosure proposes a lockset, including: a front handle assembly and a rear handle assembly, where the rear handle assembly includes a rear fixing base and a rear handle body provided on the rear fixing base; the rear fixing base is mounted on a door leaf; the lockset further includes a connecting rod and a first fastening screw; the connecting rod is connected between the front handle assembly and the rear fixing base; and with a head facing rearward, the first fastening screw is provided outside the rear handle body, and locks and connects the rear fixing base and a rear end of the connecting rod together.

The appearance features of locksets are diverse. For example, the rear handle of a knob lock has a distinctive large-head-small-tail appearance feature. With the rear handle pre-assembled to the rear fixing base, screws are driven into the rear fixing base to secure both the rear handle and rear fixing base together onto the door leaf. During this operation, the large-head rear handle inevitably becomes an obstruction. To solve the above technical difficulty, the present disclosure further proposes the following solution. Viewed from rear to front, a through hole penetrating in a front-to-rear direction and corresponding to the first fastening screw is provided in the rear handle body; the lockset further includes a rear handle cover body movably connected to the rear handle body; the rear handle cover body is configured to cover the through hole; and after the rear handle cover body is moved to expose the through hole, the through hole allows a screwdriver to pass through to rotate the first fastening screw.

According to the above technical solution, compared with the prior art, the present disclosure has the following beneficial technical effects. First, a through hole penetrating in the front-to-rear direction and corresponding to the first fastening screw is provided on the rear handle body. Thus, during mounting, a screwdriver can pass through the through hole to tighten the first fastening screw onto the rear fixing base and the connecting rod. This mounting structure provides a technical foundation for pre-assembling the rear handle body with the rear fixing base and then mounting them together onto the door leaf. Second, the rear handle cover body can cover the through hole. When the rear handle cover body covers the through hole, it prevents the through hole from adversely affecting the appearance of the rear handle body.

Because the present disclosure has the above characteristics and advantages, the present disclosure can be applied to knob locks or other types of locksets.

BRIEF DESCRIPTION OF THE DRAWINGS

The above and/or additional aspects and advantages of the present disclosure will become apparent and easy to understand from the description of the embodiments in conjunction with the following drawings.

DETAILED DESCRIPTION OF THE EMBODIMENTS

Figure 1:
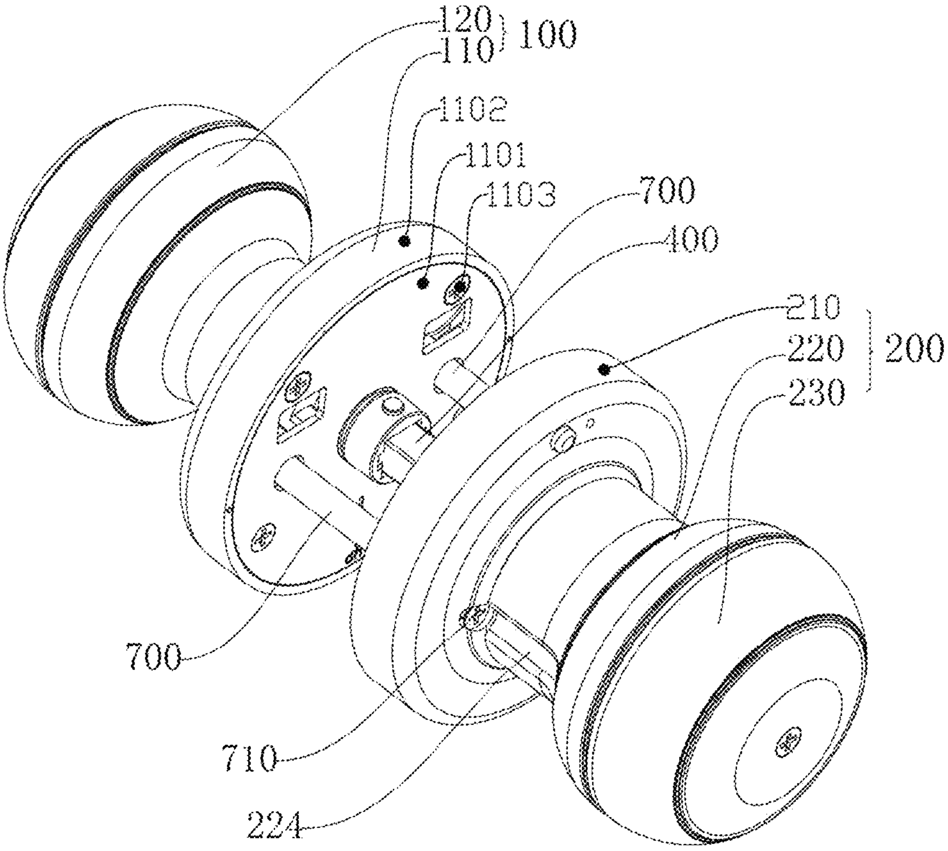
FIG. 1 is a structural view of a lockset according to a technical solution of the present disclosure.

The lockset in the technical solutions of the present disclosure is further described below with reference to the drawings. The various detailed implementation solutions disclosed below may be selectively applied or combined in one embodiment, even if they are not directly related or synergistic in function, unless explicitly stated to be equivalent or alternative implementation solutions.

As shown in FIG. 1 to FIG. 9, a lockset includes: front handle assembly 100 and rear handle assembly 200. The rear handle assembly 200 includes rear fixing base 210 and rear handle body 220 provided on the rear fixing base 210. The rear fixing base 210 is configured to be mounted on door leaf 9. The lockset further includes connecting rod 700 and first fastening screw 710. The connecting rod 700 is connected between the front handle assembly 100 and the rear fixing base 210. With a head facing rearward, the first fastening screw 710 is provided outside the rear handle body 220, and locks and connects the rear fixing base 210 and a rear end of the connecting rod 700 together.

The front handle assembly 100 and the rear handle assembly 200 are named based on their relative positions. Using the door leaf 9 as a reference, the handle assembly located in front of the door leaf 9 is named the front handle assembly 100, and the handle assembly located behind the door leaf 9 is named the rear handle assembly 200. "Viewed from rear to front" mentioned below should be understood as viewed from behind the door leaf 9 towards the front.

The head of the first fastening screw 710 is provided with a driving structure that cooperates with screwdriver 91, such as a straight slot, cross slot, or other slot type adapted for a screwing operation, to allow the first fastening screw 710 to be tightened or loosened by applying torque through the screwdriver 91. The head of the first fastening screw 710 faces rearward and its tail faces forward, facilitating an operator standing behind the door leaf 9 to rotate the first fastening screw 710. Heads of fastening screws such as second, third, and fourth fastening screws discussed below are provided with similar driving structures cooperating with the screwdriver 91.

The first fastening screw 710 is provided outside the rear handle body 220. Thus, the first fastening screw 710 can lock and connect the rear fixing base 210 and the connecting rod 700 together without occupying the internal space of the rear handle body 220, providing favorable conditions for mounting other components within the internal space of the rear handle body 220.

The connecting rod 700 may adopt a threaded sleeve. Both front and rear ends of the threaded sleeve are provided with internal threads. To stably mount the front handle assembly 100 and the rear handle assembly 200 onto the door leaf 9, a pair of connecting rods 700 is generally provided, and a pair of first fastening screws 710 locks and connects the rear fixing base 210 to rear ends of the pair of connecting rods 700 together.

Figure 4:
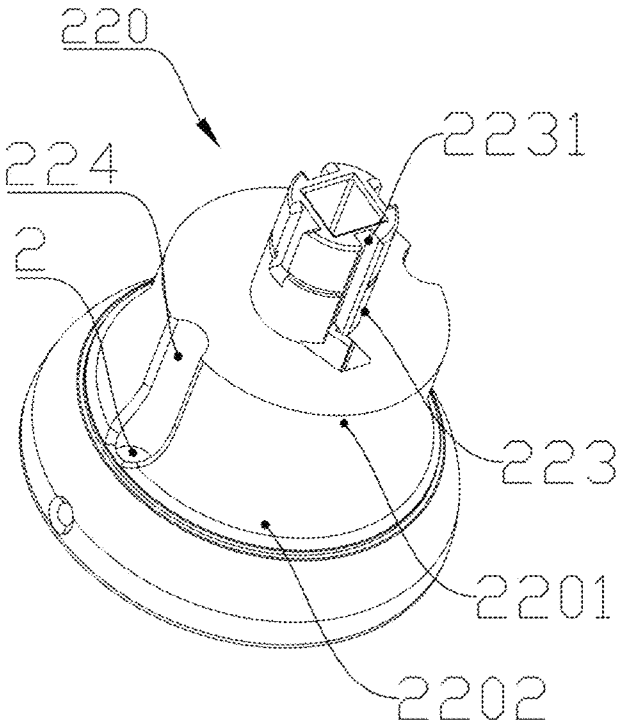
FIG. 4 is a three-dimensional structural view of a rear handle body.
Figure 5:
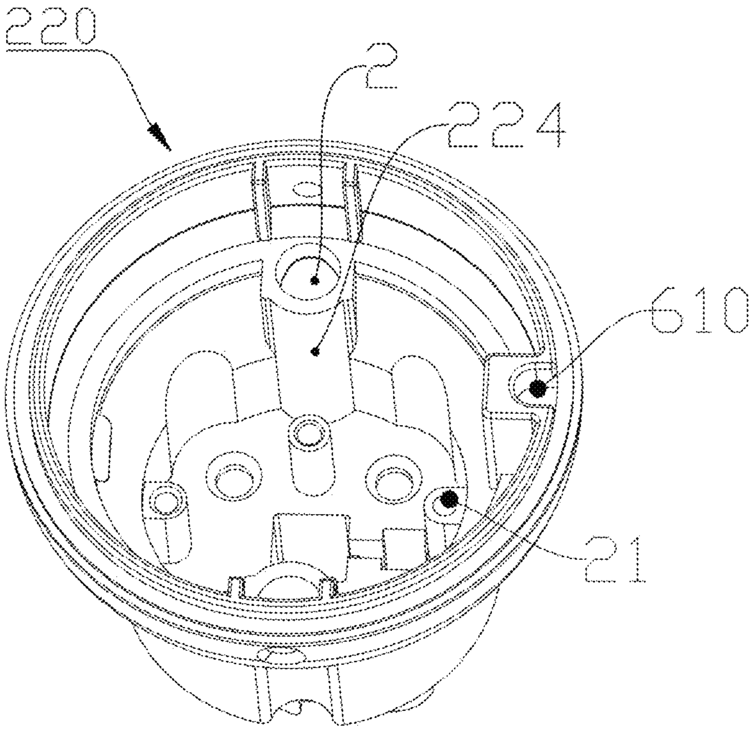
FIG. 5 is a three-dimensional structural view of the rear handle body shown in FIG. 4 after inversion.
Figure 6:
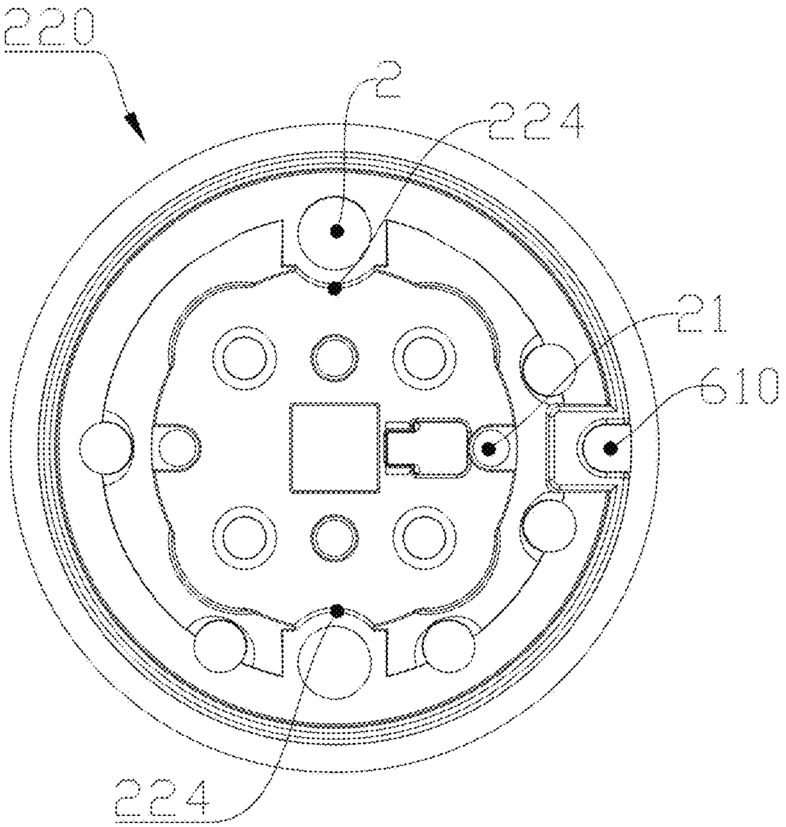
FIG. 6 is a top view of the rear handle body shown in FIG. 5.
Figure 9:
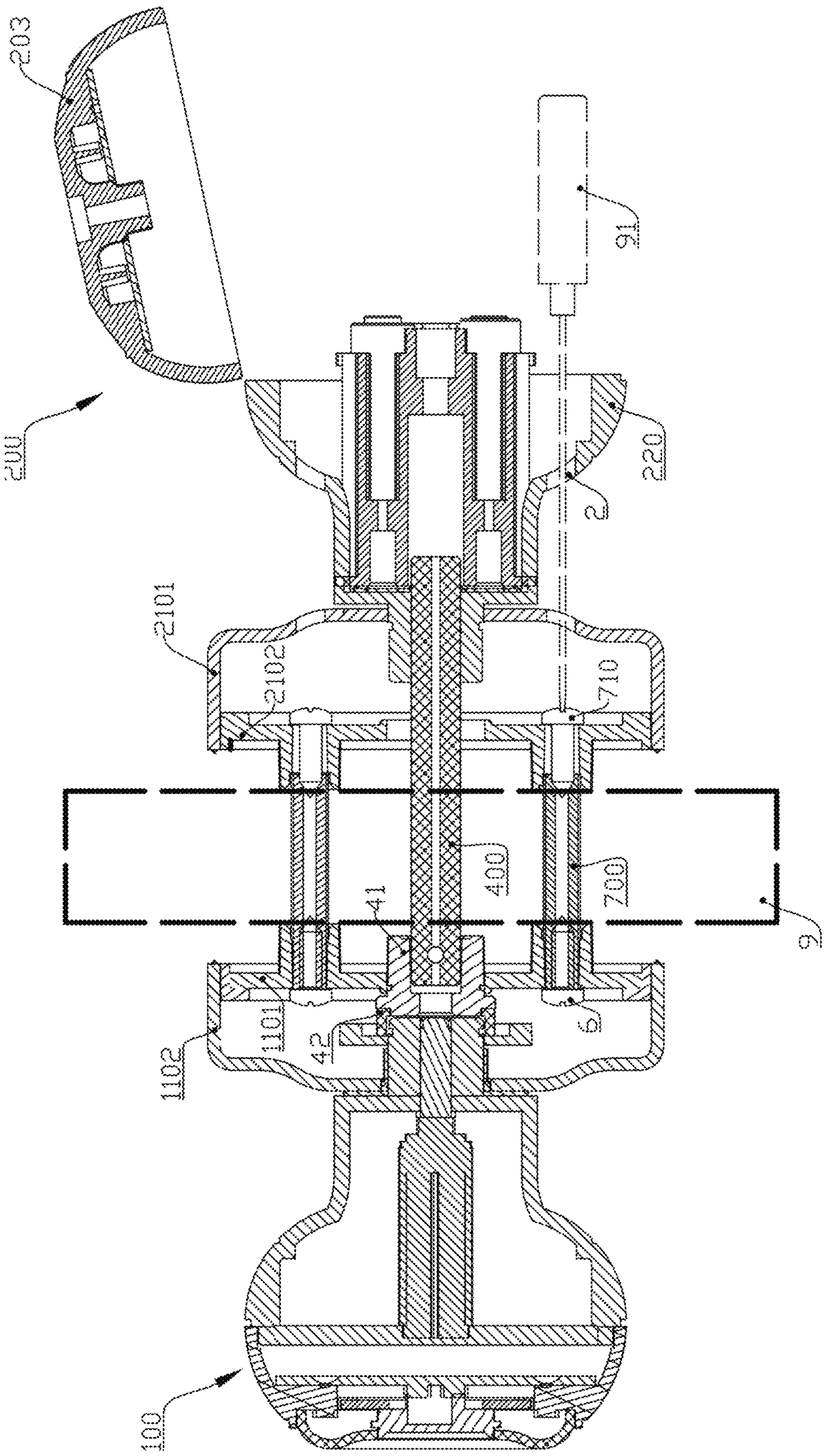
FIG. 9 is a cross-sectional view of the lockset, where the rear handle cover body is in an open state, dashed portion 9 represents a door leaf, and dashed portion 91 represents a screwdriver.

As shown in FIG. 4, FIG. 5, and FIG. 9, viewed from rear to front, through hole 2 penetrating in a front-to-rear direction and corresponding to the first fastening screw 710 is provided in the rear handle body 220. The lockset further includes rear handle cover body 230 movably connected to the rear handle body 220. The rear handle cover body 230 is configured to cover the through hole 2. After the rear handle cover body 230 is moved to expose the through hole 2, the through hole 2 allows the screwdriver 91 to pass through to rotate the first fastening screw 710.

Viewed from rear to front, the through hole 2 penetrating in the front-to-rear direction and corresponding to the first fastening screw 710 is provided in the rear handle body 220. Understandably, the through hole 2 and the first fastening screw 710 are arranged correspondingly in the front-to-rear direction. The head of the first fastening screw 710 faces the through hole 2, and the axis direction of the through hole 2 is provided along the front-to-rear direction.

The rear handle cover body 230 is movably connected to the rear handle body 220. Understandably, the rear handle cover body 230 may be detachable from the rear handle body 220. Alternatively, if the rear handle cover body cannot be detached, the rear handle cover body may be able to slide or be hinged on the rear handle body 220. The rear handle cover body 230 can cover the through hole 2, preventing the through hole 2 from being exposed to adversely affect the appearance of the rear handle body 220. After the through hole 2 is exposed, an operator standing behind the door can hold the screwdriver 91, allowing the screwdriver 91 to pass through the through hole 2 to tighten or loosen the first fastening screw 710. This design reduces interference with the rear handle body 220 during the operation and also reduces constraints on the appearance or size design of the rear handle body 220 imposed by reserving operational space.

Furthermore, as shown in FIG. 4, avoidance groove 224 is provided in an outer side wall of the rear handle body 220. The avoidance groove 224 is provided correspondingly to the through hole 2 in the front-to-rear direction and is configured to avoid the screwdriver 91.

Figure 3:
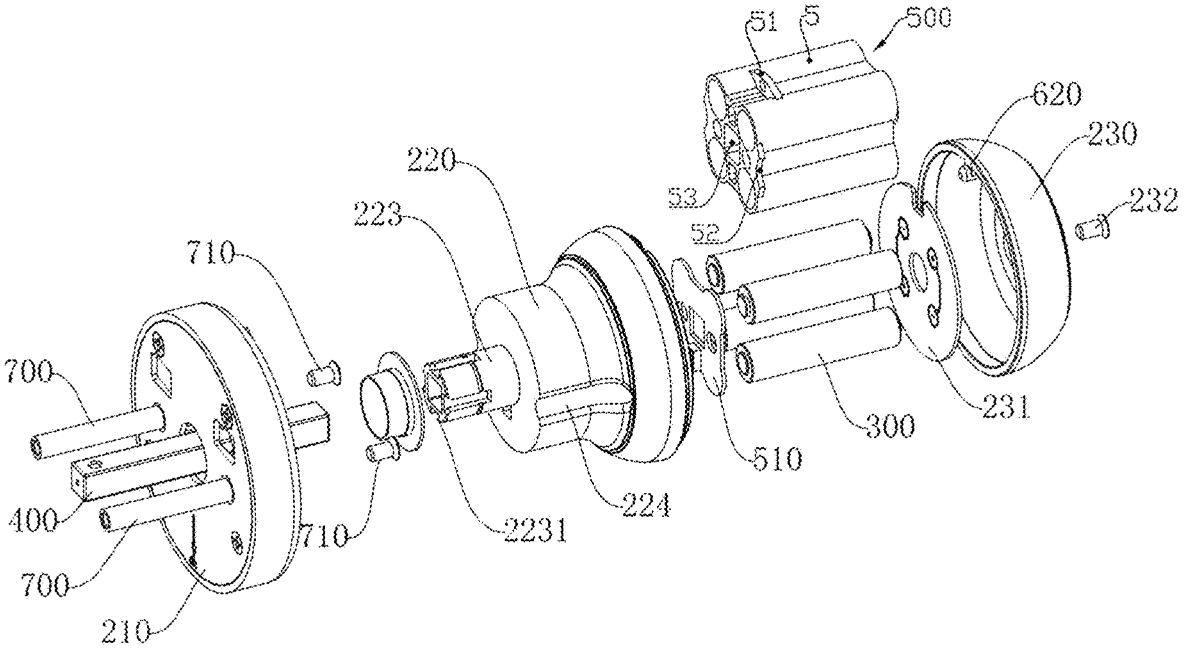
FIG. 3 is an exploded view of the lockset after removal of the front handle assembly.

Furthermore, as shown in FIG. 3 and FIG. 4, the rear handle body 220 includes rear handle supporting shaft 2201 and rear handle housing 2202. The rear handle supporting shaft 2201 is provided on the rear fixing base 210. The rear handle housing 2202 and the rear handle cover body 230 are connected together to form a handle gripping portion. An outer diameter of the handle gripping portion is larger than an outer diameter of the rear handle supporting shaft 2201. The through hole 2 is provided in the rear handle housing 2202, and the avoidance groove 224 is provided in an outer side wall of the rear handle supporting shaft 2201. Thus, after the rear handle body 220 and the rear handle cover body 230 are assembled together, the whole resembles a lollipop shape with a large head and a small tail. The handle gripping portion may be spherical, square, or other irregular shapes. Viewed from rear to front, the rear handle body 220 shields the first fastening screw 710.

Figure 2:
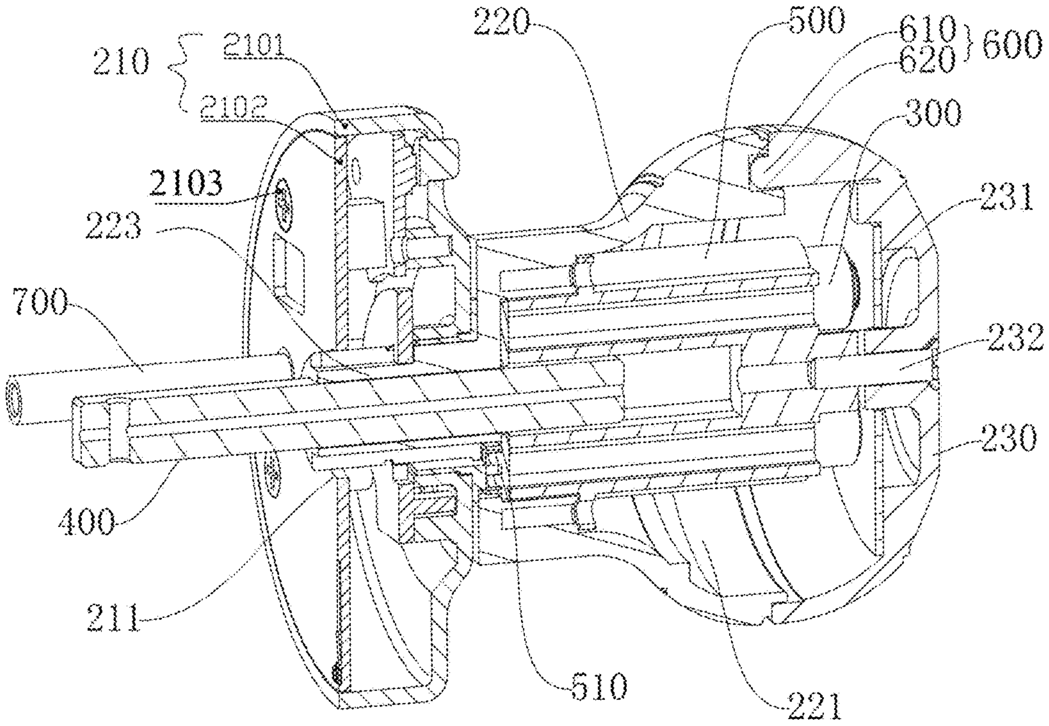
FIG. 2 is an internal cross-sectional view of the lockset after removal of a front handle assembly.

As shown in FIG. 2, the rear fixing base 210 includes rear base bottom plate 2102 and rear base cover plate 2101. The rear base bottom plate 2102 is mounted on the door leaf 9. The lockset further includes second fastening screw 2103. The second fastening screw 2103 locks and connects the rear base bottom plate 2102 and the rear base cover plate 2101 together. After the rear handle assembly 200 is mounted on the door leaf 9, the head of the second fastening screw 2103 is provided between the door leaf 9 and the rear base bottom plate 2102. Thus, the second fastening screw 2103 can be hidden, thereby increasing the difficulty of disassembling the rear fixing base 210 and damaging the lockset. The head of the second fastening screw 2103 may be partially or fully embedded into the door leaf 9 or the rear base bottom plate 2102.

As shown in FIG. 1, the front handle assembly 100 includes front fixing base 110. The front fixing base 110 includes front base bottom plate 1101 and front base cover plate 1102. The front base bottom plate 1101 is mounted on the door leaf 9. A front end of the connecting rod 700 is fixedly connected to the front base bottom plate 1101. The lockset further includes third fastening screw 1103. The third fastening screw 1103 locks and connects the front base bottom plate 1101 and the front base cover plate 1102 together. After the front handle assembly 100 is mounted on the door leaf 9, the head of the third fastening screw 1103 is provided between the door leaf 9 and the front base bottom plate 1101. Thus, the third fastening screw 1103 can be hidden, thereby increasing the difficulty of disassembling the front fixing base 110 and damaging the lockset. The head of the third fastening screw 1103 may be partially or fully embedded into the door leaf 9 or the front base bottom plate 1101.

Taking the technical solution shown in FIG. 1, FIG. 2, and FIG. 9 as an example, the mounting process of the lockset is described in detail below. First, the front handle assembly 100 is assembled. Sixth fastening screw 6 is used to fixedly connect the front base bottom plate 1101 to the front end of the connecting rod 700. The front handle assembly 100 further includes front handle 120. A front shaft end of the front handle 120 is inserted into an inner side of the front base cover plate 1102 and is rotatably fixed to the front base cover plate 1102 by means of a front retaining ring (not shown in FIG. 9). A clutch is provided on the front fixing base 110. The clutch includes first and second clutch members that can engage. First, the first clutch member 41 is provided on the front base bottom plate 1101 such that its engaging end extends to an outer side of the front base bottom plate 1101. Subsequently, the second clutch member 42 engages with the first clutch member 41, and the front base cover plate 1102 covers the front base bottom plate 1101. At this time, the front shaft end of the front handle 120 and the second clutch member 42 engage to form a transmission connection. Finally, the fastening and assembly of the front base bottom plate 1101 and the front base cover plate 1102 is completed via the third fastening screw 1103. Transmission shaft 400 for driving a lock bolt is further provided. A front end of the transmission shaft 400 is kept in synchronous linkage with the first clutch member via a pin. Then the rear handle assembly 200 is assembled. Shaft extension end 223 of the rear handle body 220 is inserted into an inner side of the rear base cover plate 2101 and is rotatably fixed to the rear base cover plate 2101 by means of a rear retaining ring (not shown in FIG. 9). The fastening and assembly of the rear base bottom plate 2102 and the rear base cover plate 2101 is completed and via the second fastening screw 2103. The front handle assembly 100 and the rear handle assembly 200 are mounted on the door leaf 9. Door leaf holes are drilled on the door leaf 9 for a pair of connecting rods 700 to pass through. The front handle assembly 100 is placed on the door leaf 9, and the connecting rods 700 are inserted into the door leaf holes. The rear handle assembly 200 is placed on the door leaf 9, and a rear end of the transmission shaft 400 passes through the rear handle body 220 and is inserted into counterbore 53 to be discussed later. The through hole 2 aligns with the connecting rod 700. An operator standing behind the door holds the screwdriver 91, allowing the screwdriver 91 to pass through the through hole 2 to rotate the first fastening screw 710. The first fastening screw 710 passes through the rear fixing base 210 and is threaded into the rear end of the connecting rod 700. Thus, the front handle assembly 100 and the rear handle assembly 200 are fixed onto the door leaf 9. It is recommended to mount the rear handle assembly 200 on an indoor side.

The first fastening screw 710 is provided outside the rear handle body 220, and the through hole 2 is provided on the rear handle body 220. Thus, it is basically unnecessary to reserve a large operational space inside the rear handle body 220 for rotating the first fastening screw 710, providing a favorable technical foundation for mounting other functional modules inside the rear handle body 220. As shown in FIG. 3 and FIG. 5, the rear handle cover body 230 movably connected to the rear handle body 220 is further provided. The rear handle body 220 includes accommodating cavity 221 with an opening. The rear handle cover body 230 is configured to cover or expose the opening of the accommodating cavity 221. An accommodating space is defined between the rear handle cover body 230 and the rear handle body 220. Battery compartment 500 for mounting a battery 300 is provided within the accommodating space. The battery 300 may be configured to provide electrical energy for power-consuming units of the lockset, such as an electric unlocking mechanism mounted on the front handle assembly 100.

Furthermore, viewed from rear to front, the through hole 2 penetrating in the front-to-rear direction and corresponding to the first fastening screw 710 is provided in the rear handle body 220. The rear handle cover body 230 is configured to cover the through hole 2. After the rear handle cover body 230 is moved to expose the through hole 2, the through hole 2 allows the screwdriver 91 to pass through to rotate the first fastening screw 710. The through hole 2 is provided at a peripheral area of the battery compartment 500.

Furthermore, as shown in FIG. 4, the rear handle body 220 includes the shaft extension end 223. The shaft extension end 223 is rotatably inserted into the rear fixing base 210. Wire groove 2231 recessed radially and inwardly is provided in an outer side wall of the shaft extension end 223. The wire groove 2231 extends along a length direction of the shaft extension end 223 and communicates with the accommodating cavity 221. A signal wire electrically connected to the battery 300 passes through the wire groove 2231 to extend outside the accommodating cavity 221. First through hole 211 is provided on the rear fixing base 210. The shaft extension end 223 is inserted into the first through hole 211. When the shaft extension end 223 rotates, the wire groove 2231 rotates together with the shaft extension end 223, and a wiring passage for the signal wire to pass through is always formed between the wire groove 2231 and an inner wall of the first through hole 211. Compared to the machining method of drilling the wiring passage in the shaft extension end 223, the structure adopted by the present disclosure greatly reduces the production and machining difficulty of the rear handle body 220, and threading the signal wire is more convenient. The shaft extension end 223 is provided on the rear handle supporting shaft 2201.

Furthermore, as shown in FIG. 3, the battery compartment 500 allows a first electrode of the battery 300 to face a bottom of the accommodating cavity and a second electrode of the battery to face the rear handle cover body 230. The lockset further includes first electrical contact 510 and second electrical contact 231. The first electrical contact 510 is electrically connected to the first electrode of the battery 300, and the second electrical contact 231 is electrically connected to the second electrode of the battery 300. The first electrical contact 510 is provided at a bottom of the battery compartment 500, and the second electrical contact 231 is provided at an inner side of the rear handle cover body 230. The signal wire is electrically connected to the first electrical contact 510. The first electrical contact 510 is provided at the bottom of the battery compartment 500. Understandably, the first electrical contact 510 is provided inside or outside the bottom of the battery compartment 500. Additionally, when a plurality of batteries 300, such as four, are configured, four electrical connection points electrically connected to the electrodes of the four batteries 300 are correspondingly provided on the first electrical contact 510 and the second electrical contact 231 respectively. In an implementation, the battery is a cylindrical dry battery. The first electrode and the second electrode are provided at front and rear ends of the cylindrical dry battery, respectively, where if one is a positive electrode, the other is a negative electrode. The cylindrical dry battery is mounted upright along the front-to-rear direction. Compared to horizontal mounting, in upright mounting, the rear handle body 220 appears slimmer and more compact in appearance, and it facilitates the accommodating space to contain more cylindrical dry batteries.

Furthermore, as shown in FIG. 2, radial limiting mechanism 600 is provided between the rear handle body 220 and the rear handle cover body 230. When the rear handle cover body 230 covers the rear handle body 220, the radial limiting mechanism 600 limits a radial position of the rear handle cover body 230 relative to the rear handle body 220 and limits a radial position of the second electrical contact 231 relative to the battery compartment 500. With the positioning effect of the radial limiting mechanism 600, when the rear handle cover body 230 covers the rear handle body 220, the radial layout position of the electrical connection point on the second electrical contact 231 is correct, thereby ensuring correct electrical connection to the second electrode of the battery 300 and avoiding affecting the normal operation of the lockset due to incorrect polarity connection. The structural form of the radial limiting mechanism 600 is diverse. For example, the radial limiting mechanism 600 is a hinge mechanism or a sliding mechanism that movably connects the rear handle body 220 and the rear handle cover body 230 together. Alternatively, the radial limiting mechanism 600 includes positioning hole 610 and positioning pin 620 configured to be inserted into the positioning hole 610. One of the positioning hole 610 and the positioning pin 620 is provided in the rear handle body 220, and the other of the positioning hole 610 and the positioning pin 620 is provided in the rear handle cover body 230. Specifically, the positioning hole 610 is provided at an open edge of the accommodating cavity 221 of the rear handle body 220, and the positioning pin 620 is provided at an open edge of the rear cover body 230. Thus, utilizing the unique matching of the positioning hole 610 and the positioning pin 620, the rear handle cover body 230 and the second electrical contact 231 are radially positioned.

Figure 7:
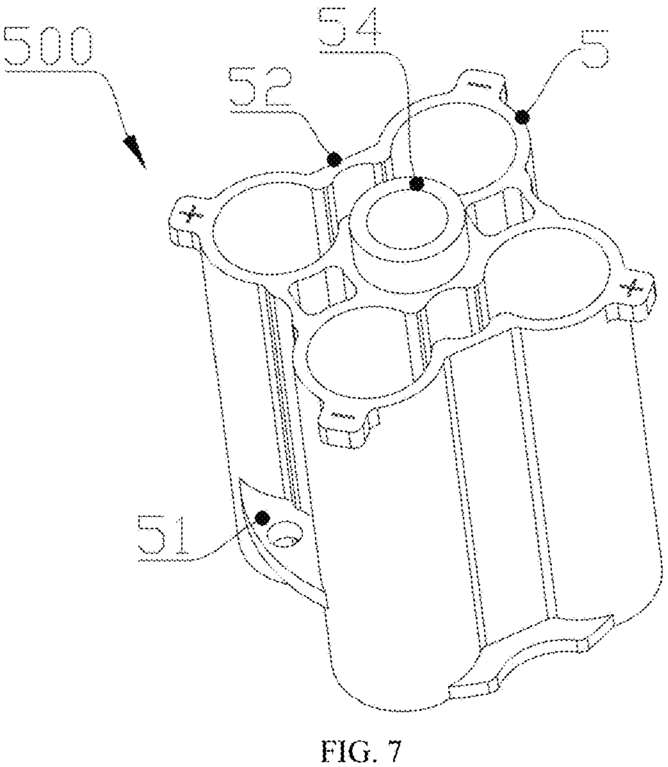
FIG. 7 is a three-dimensional structural view of a battery compartment.
Figure 8:
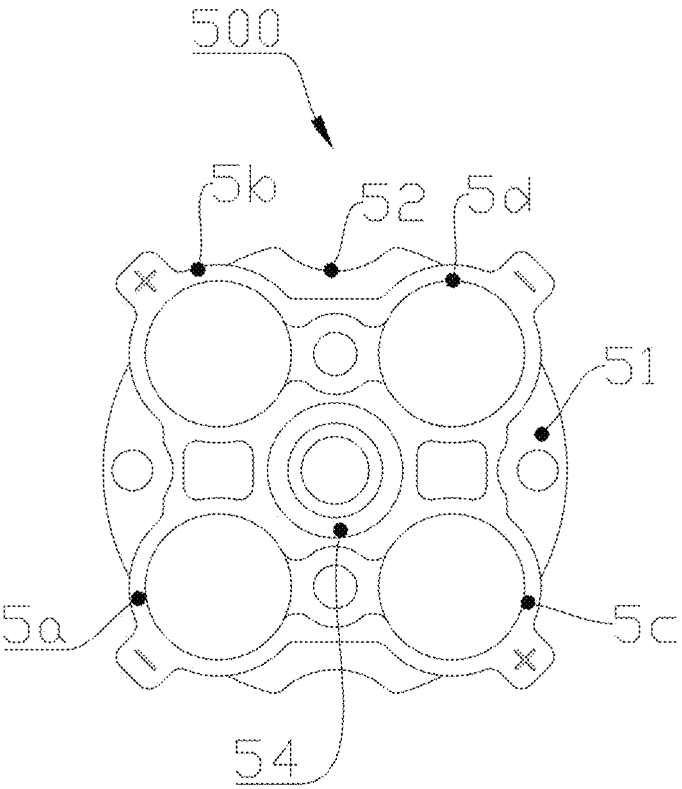
FIG. 8 is a top view of the battery compartment shown in FIG. 7.

Furthermore, as shown in FIG. 7 and FIG. 8, the battery compartment includes four mounting chambers 5 for fixing the battery. The four mounting chambers 5 are divided into two columns arranged side by side, with two mounting chambers in each column (mounting chambers at different positions are respectively marked as 5*a*, 5*b*, 5*c*, and 5*d*, located at four corners of a square). The mounting chamber 5 is configured to fix battery 300. A prompt mark for indicating an electrode placement direction of the battery 300 is provided on each mounting chamber 5, and two mounting chambers 5 located diagonally opposite each other adopt the same type of prompt mark. Under the prompt of the prompt mark, the electrodes of the battery 300 can be correctly placed, simplifying the mounting operation. The two mounting chambers 5 located diagonally opposite each other adopt the same type of prompt mark. Understandably, if the two mounting chambers 5 in an upper left corner and a lower right corner both adopt prompt marks indicating that negative electrodes face the rear handle cover body 230, then the two mounting chambers 5 in an upper right corner and a lower left corner both adopt prompt marks indicating that positive electrodes face the rear handle cover body 230. Conversely, if the two mounting chambers 5 in the upper left corner and the lower right corner both adopt prompt marks indicating that the positive electrodes face the rear handle cover body 230, then the two mounting chambers 5 in the upper right corner and the lower left corner both adopt prompt marks indicating that the negative electrodes face the rear handle cover body 230.

Furthermore, a position limiter is provided in the accommodating cavity 221 of the rear handle body 220. The position limiter is configured to restrict the battery compartment 500 to be placed only in a first radial position or a second radial position, where the first radial position and the second radial position differ by 180°. The position limiter includes a pair of first position limiters symmetrically arranged in a left-to-right direction of the battery compartment and a pair of second position limiters symmetrically arranged in a vertical direction of the battery compartment 500. The limiting structures adopted by the first position limiter and the second position limiter are different, and they cooperate to allow the battery compartment 500 in the accommodating cavity 221 of the rear handle body 220 to be placed only in the first radial position or the second radial position. Thus, during the process of assembling the battery compartment 500 onto the rear handle body 220, the battery compartment 500 is placed only in the first radial position or the second radial position. Regardless of which radial position the battery compartment 500 is placed in, the electrode placement direction of battery 300 at the same position on the rear handle body 220 remains unchanged. Therefore, the electrode polarity facing the second electrical contact 231 of the battery 300 mounted in the mounting chamber 5 is always constant. Connecting lug 51 is provided between at least two adjacent mounting chambers 5. A fifth fastening screw passes through the connecting lug 51 to fix the battery compartment 500 to the rear handle body 220. The following explanation takes the embodiment shown in FIG. 5 to FIG. 8 (where FIG. 8 shows the first radial position of the battery compartment 500, and the first radial position rotates 180° around its center to reach the second radial position). Upper ends of the two mounting chambers (5*b* and 5*c*) located in the upper left corner and the lower right corner of the battery compartment 500 both adopt the positive electrode prompt mark "+". The positive electrode prompt mark "+" is used to prompt that the positive electrode of the battery 300 needs to be placed facing upward during mounting. Upper ends of the two mounting chambers (5*d* and 5*a*) located in the upper right corner and the lower left corner both adopt the negative electrode prompt mark "−". The negative electrode prompt mark "−" is used to prompt that the negative electrode of the battery 300 needs to be placed facing upward during mounting. The connecting lugs 51 are respectively provided between the mounting chambers (5*b* and 5*a*) and between the mounting chambers (5*d* and 5*c*). Notched portions 52 are respectively provided between the mounting chambers (5*b* and 5*d*) and between the mounting chambers (5*a* and 5*c*). A pair of positioning posts 21 provided left and right is provided in the accommodating cavity 221 of the rear handle body 220. The positioning posts 21 constitute the first position limiter. A pair of avoidance grooves 224 provided front and rear is provided on the rear handle body 220. The avoidance groove 224 appears as a rib on a wall of the accommodating cavity 221 of the rear handle body 220. The rib constitutes the second position limiter. During mounting, a pair of notched portions 52 is engaged with a pair of ribs, and a pair of connecting lugs 51 is placed on top of the pair of positioning posts 21. The fifth fastening screw (not shown in the figure) passes through the connecting lug 51 to fix the battery compartment 500 to the rear handle body 220, positioning the battery compartment 500 in the first radial position or the second radial position. Regardless of whether the battery compartment 500 is placed in the first radial position or the second radial position, the electrode placement direction of a battery 300 at the same position on the rear handle body 220 remains unchanged. For example, the negative electrode of the battery 300 in the mounting chamber in the upper right corner always faces upward.

Furthermore, as shown in FIG. 2, the battery compartment 500 includes the counterbore 53 located at the middle and a plurality of mounting chambers 5 arranged around the counterbore 53. The mounting chamber 5 is configured to fix the battery 300. The lockset further includes the transmission shaft 400. The transmission shaft 400 is in transmission connection with the rear handle body 220, and passes through the rear handle body 220 to be inserted into the counterbore 53. Thus, when a user rotates the gripping portion of the rear handle assembly 200, the transmission shaft 400 is simultaneously driven to rotate, thereby achieving the action of opening or closing the door. The transmission shaft 400 passes through the rear handle body 220 and is inserted into the counterbore 53, fully utilizing the internal space of the battery compartment 500 to accommodate the rear end of the transmission shaft 400, providing favorable conditions for adopting standard-length transmission shaft 400. The counterbore 53 is located at the middle of the battery compartment 500, and three, four, or more mounting chambers 5 are arranged around the counterbore 53. The central axes of the counterbore 53 and the transmission shaft 400 both overlap with the central axis of the rear handle supporting shaft 2201, facilitating dynamic balance when the rear handle supporting shaft 2201 rotates, and improving the user's operational feel when rotating the rear handle assembly 200.

Furthermore, as shown in FIG. 2 and FIG. 8, the battery compartment 500 further includes connecting post 54 located at the middle. The connecting post 54 is provided correspondingly to the counterbore 53 in the front-to-rear direction. The lockset further includes fourth fastening screw 232. The fourth fastening screw 232 locks and connects the rear handle cover body 230 and the connecting post 54 together. Thus, the rear handle cover body 230 is also fixed to the rear handle body 220. Disposing the connecting post 54 in the middle position of the battery compartment 500 fully utilizes the internal space of the rear handle supporting shaft 2201, improving space utilization.

The invention claimed is:

1. A lockset, comprising: a front handle assembly, a rear handle assembly, a connecting rod, and a first fastening screw, wherein the rear handle assembly comprises a rear fixing base, and a rear handle body provided on the rear fixing base; the rear fixing base is mounted on a door leaf; the connecting rod is connected between the front handle assembly and the rear fixing base; and a head of the first fastening screw faces a rear side of the door leaf, and the first fastening screw is located in an outer peripheral region of the rear handle body and configured to lock and connect the rear fixing base and a rear end of the connecting rod together;

wherein the rear handle body is provided with a through hole, the through hole corresponds to the first fastening screw, and the through hole allows an operating tool to pass therethrough to rotate the first fastening screw.

2. The lockset according to claim 1, wherein the lockset further comprises a rear handle cover body movably connected to the rear handle body; the rear handle cover body is configured to cover the through hole; and after the rear handle cover body is moved to expose the through hole, the through hole allows the operation tool to pass through to rotate the first fastening screw.

3. The lockset according to claim 1, wherein an avoidance groove is provided in an outer side wall of the rear handle body, and the avoidance groove and the through hole forming a clearance passage in an operation direction of the operation tool.

4. The lockset according to claim 2, wherein the rear handle body comprises a rear handle supporting shaft and a rear handle housing; the rear handle supporting shaft is provided on the rear fixing base; the rear handle housing and the rear handle cover body are connected together to form a handle gripping portion; an outer diameter of the handle gripping portion is larger than an outer diameter of the rear handle supporting shaft; and the through hole is provided in the rear handle housing.

5. The lockset according to claim 2, wherein the rear fixing base comprises a rear base bottom plate and a rear base cover plate; the rear base bottom plate is mounted on the door leaf; the lockset further comprises a second fastening screw, wherein the second fastening screw is configured to lock and connect the rear base bottom plate and the rear base cover plate together; and after the rear handle assembly is mounted on the door leaf, a head of the second fastening screw is provided between the door leaf and the rear base bottom plate.

6. The lockset according to claim 2, wherein the front handle assembly comprises a front fixing base; the front fixing base comprises a front base bottom plate and a front base cover plate; the front base bottom plate is mounted on the door leaf; a front end of the connecting rod is fixedly connected to the front base bottom plate; the lockset further comprises a third fastening screw, wherein the third fastening screw is configured to lock and connect the front base bottom plate and the front base cover plate together; and after the front handle assembly is mounted on the door leaf, a head of the third fastening screw is provided between the door leaf and the front base bottom plate.

7. The lockset according to claim 1, further comprising a rear handle cover body movably connected to the rear handle body, wherein the rear handle body comprises an accommodating cavity with an opening; the rear handle cover body is configured to cover or expose the opening of the accommodating cavity; an accommodating space is defined between the rear handle cover body and the rear handle body; and a battery compartment for mounting a battery is provided within the accommodating space.

8. The lockset according to claim 7, wherein the rear handle cover body is configured to cover the through hole; after the rear handle cover body is moved to expose the through hole, the through hole allows an operation tool to pass through to rotate the first fastening screw; and the through hole is provided at a peripheral area of the battery compartment.

9. The lockset according to claim 7, wherein the rear handle body comprises a shaft extension end; the shaft extension end is rotatably inserted into the rear fixing base; a wire groove recessed radially and inwardly is provided in an outer side wall of the shaft extension end; the wire groove extends along a length direction of the shaft extension end and communicates with the accommodating cavity; and a signal wire electrically connected to the battery passes through the wire groove to extend outside the accommodating cavity.

10. The lockset according to claim 9, wherein the battery compartment allows a first electrode of the battery to face a bottom of the accommodating cavity and a second electrode of the battery to face the rear handle cover body; the lockset further comprises a first electrical contact and a second electrical contact; the first electrical contact is electrically connected to the first electrode of the battery, and the second electrical contact is electrically connected to the second electrode of the battery; the first electrical contact is provided at a bottom of the battery compartment, and the second electrical contact is provided at an inner side of the rear handle cover body; and the signal wire is electrically connected to the first electrical contact.

11. The lockset according to claim 10, wherein a radial limiting mechanism is provided between the rear handle body and the rear handle cover body; and when the rear handle cover body covers the rear handle body, the radial limiting mechanism limits a radial position of the rear handle cover body relative to the rear handle body and limits a radial position of the second electrical contact relative to the battery compartment.

12. The lockset according to claim 11, wherein the battery compartment comprises four mounting chambers for fixing the battery; the four mounting chambers are divided into two columns arranged side by side, with two mounting chambers in each column; each of the four mounting chambers is provided with a prompt mark for indicating an electrode placement direction of the battery; and two mounting chambers located diagonally opposite each other in the four mounting chambers adopt a same type of prompt mark.

13. The lockset according to claim 12, wherein a position limiter is provided in the accommodating cavity of the rear handle body; the position limiter is configured to restrict the battery compartment to be placed only in a first radial position or a second radial position; and the first radial position and the second radial position differ by 180°.

14. The lockset according to claim 13, wherein the position limiter comprises a pair of first position limiters symmetrically arranged in a left-to-right direction of the battery compartment and a pair of second position limiters symmetrically arranged in a vertical direction of the battery compartment; the pair of first position limiters and the pair of second position limiters adopt different limiting structures and cooperate to allow the battery compartment in the accommodating cavity of the rear handle body to be placed only in the first radial position or the second radial position.

15. The lockset according to claim 13, wherein a connecting lug is provided between at least two adjacent mounting chambers in the four mounting chambers, and a fifth fastening screw passes through the connecting lug to fix the battery compartment to the rear handle body.

16. The lockset according to claim 11, wherein the radial limiting mechanism comprises a positioning hole and a positioning pin configured to be inserted into the positioning hole; and one of the positioning hole and the positioning pin is provided in the rear handle body, and the other of the positioning hole and the positioning pin is provided in the rear handle cover body.

17. The lockset according to claim 16, wherein the battery compartment further comprises a connecting post located at a middle of the battery compartment; and the lockset further comprises a fourth fastening screw, wherein the fourth fastening screw is configured to lock and connect the rear handle cover body and the connecting post together.

18. The lockset according to claim 7, wherein the battery compartment comprises a counterbore located at a middle of the battery compartment and a plurality of mounting chambers arranged around the counterbore; the plurality of mounting chambers are configured to fix the battery; the lockset further comprises a transmission shaft; and the transmission shaft is in transmission connection with the rear handle body, and passes through the rear handle body to be inserted into the counterbore.

19. The lockset according to claim 4, wherein an avoidance groove is aligned with the through hole along a direction perpendicular to the door leaf.

20. The lockset assembly according to claim 4, wherein an avoidance groove is provided on an outer side wall of the rear handle supporting shaft.

* * * * *